(12) United States Patent
Milette et al.

(10) Patent No.: US 12,321,031 B2
(45) Date of Patent: Jun. 3, 2025

(54) SUPPORT FRAME FOR PROVIDING ADAPTER-LESS CONNECTIONS FOR FIBER OPTIC CABLES

(71) Applicant: BELDEN CANADA ULC, Saint-Laurent (CA)

(72) Inventors: Luc Milette, Montreal (CA); Christian Roa-Quispe, Laval (CA); Lucas Rakoto-Sam, Montreal (CA); Oscar Alberto Lazarte Barrios, Ville St-Laurent (CA)

(73) Assignee: BELDEN CANADA ULC, Saint-Laurent (CA)

( * ) Notice: Subject to any disclaimer, the term of this patent is extended or adjusted under 35 U.S.C. 154(b) by 0 days.

(21) Appl. No.: 17/862,389

(22) Filed: Jul. 11, 2022

(65) Prior Publication Data

US 2023/0008823 A1 Jan. 12, 2023

Related U.S. Application Data

(60) Provisional application No. 63/220,347, filed on Jul. 9, 2021.

(51) Int. Cl.
*G02B 6/00* (2006.01)
*G02B 6/44* (2006.01)

(52) U.S. Cl.
CPC ......... *G02B 6/4452* (2013.01); *G02B 6/4471* (2013.01)

(58) Field of Classification Search
CPC ....... G02B 6/4452; G02B 6/4471; G02B 6/00
See application file for complete search history.

(56) References Cited

U.S. PATENT DOCUMENTS

| | | | |
|---|---|---|---|
| 4,995,688 | A | 2/1991 | Anton et al. |
| 5,987,203 | A | 11/1999 | Abel et al. |
| 6,418,262 | B1 | 7/2002 | Puetz et al. |
| 8,913,866 | B2 | 12/2014 | Cote et al. |
| 9,075,220 | B2 | 7/2015 | Mudd et al. |
| 9,261,654 | B2 | 2/2016 | Murphy et al. |

(Continued)

OTHER PUBLICATIONS

International Search Report and Written Opinion dated Jan. 6, 2023 in corresponding International Application No. PCT/IB2022/000519, 12 pages.

*Primary Examiner* — Jennifer Doan
(74) *Attorney, Agent, or Firm* — MH2 Technology Law Group, LLP

(57) ABSTRACT

A support frame configured to provide adapter-less fiber optic connections for fiber optic cables including a connection block configured to be fixedly coupled with a main body. A front wall of the main body includes a surface configured to abut a surface of the connection block, the connection block includes a connection port configured to receive a first fiber optic connector, and the front wall of the main body includes a connection port configured to receive a second fiber optic connector. The connection port of the connection block is configured to be aligned with the connection port of the main body such that the connection block and the main body are configured to optically couple the first fiber optic connector with the second fiber optic connector, and the connection block and the main body are configured to provide an adapter-less fiber optic connection for the first and second fiber optic connectors. The connection block may be a single piece of unitary construction.

26 Claims, 9 Drawing Sheets

(56) References Cited

U.S. PATENT DOCUMENTS

| | | | |
|---|---|---|---|
| 10,606,007 B2* | 3/2020 | Vermeulen | G02B 6/4446 |
| 10,754,096 B2 | 8/2020 | Murray et al. | |
| 10,782,483 B2 | 9/2020 | Eberle, Jr. et al. | |
| 11,061,197 B2 | 7/2021 | Ott et al. | |
| 2002/0150369 A1 | 10/2002 | Battey et al. | |
| 2010/0322583 A1* | 12/2010 | Cooke | G02B 6/4452 |
| | | | 385/135 |
| 2019/0056559 A1* | 2/2019 | Leeman | G02B 6/4455 |
| 2019/0101717 A1 | 4/2019 | Pilon | |
| 2021/0181443 A1 | 6/2021 | Zhou et al. | |

\* cited by examiner

SUPPORT FRAME FOR PROVIDING ADAPTER-LESS CONNECTIONS FOR FIBER OPTIC CABLES

CROSS REFERENCE TO RELATED APPLICATION

This application claims the benefit of U.S. Provisional Application No. 63/220,347, filed Jul. 9, 2021, the disclosure of which is hereby incorporated by reference herein in its entirety.

TECHNICAL FIELD

The present disclosure relates generally to optical communication networks. More particularly, the present disclosure relates to a support frame that provides adapter-less fiber optic connections in a fiber optic communication system and can be used with a fiber distribution cabinet.

BACKGROUND

As demand for data and connectivity increases, network planners and installers are seeking more efficient and cost-effective deployment options for their fiber to the X (FTTX) rollouts. FTTX comprises the many variants of fiber optic access infrastructure. These include fiber to the home (FTTH), fiber to the premise (FTTP), fiber to the building (FTTB), fiber to the node (FTTN), and fiber to the curb or cabinet (FTTC). The optical FTTP or FTTH network is an optical access network that supplies broadband or ultra-broadband communication services to a number of end users (e.g., services that require data transmission speeds measuring several hundred Mbit/s or even higher).

An optical FTTX network typically includes fiber optic cassettes or modules for use in terminating fiber optic trunk cables and splitting them out to patch cables which are removably arranged on tray systems within a rack mounted case. The cassettes or modules typically include adapters for optically coupling fiber optic connectors. One drawback of these cassettes or modules is that the adapters are separate structural elements that are mounted in the cassettes or modules, which causes installation inefficiencies associated with having to work with a plurality of individual adapters. Further, such individually installed adapters can often times wiggle after installation in the cassette or module due to manufacturing tolerances. Further, such conventional cassettes or modules can be difficult to manufacture in order to provide openings for receiving and securing adapters.

Another disadvantage of the conventional cassettes or modules is that the fiber optic cables and connectors are disposed in an interior chamber of the cassette or module, thereby preventing access to the cables and connectors for cleaning and/or reconfiguration. Further, the top wall or cover that encloses the cables and connectors increases the manufacturing cost of the cassettes or modules, as well as the amount of future waste when disposed of.

It may be desirable to provide a support frame for use in a fiber distribution network that overcomes one or more of the aforementioned disadvantages of conventional cassettes or modules. For example, it may be desirable to provide a support frame that provides adapter-less fiber optic connections for fiber optic cables; that is, the support frame does not include openings for receiving and securing adapters and is therefore easier to manufacture and avoids adapter wiggle. It may be desirable to provide a support frame that includes an open region that houses fiber optical cables to allow access to fiber cables and fiber optic connectors in the open region for connector cleaning (e.g., the outside surface of the ferrule) and/or reconfiguration. The support frame having an open region also eliminates unnecessary structure (e.g., a top wall or cover), thereby providing cost savings and reduction of waste. It may also be desirable to provide a support frame having a single connection block that simplifies installation by avoiding the need to install multiple individual adapters. It may further be desirable to provide a connection block and/or a support frame that includes a continuous surface across a width of the support frame that can include improved visible identification features, such as color coding and labeling.

SUMMARY

According to various exemplary embodiments of the disclosure, a support frame configured to provide adapter-less fiber optic connections for fiber optic cables and configured to be mounted to a rack of a fiber distribution system may include a main body having a front wall, a rear wall, a first side wall, a second side wall, and a bottom wall; and a connection block configured to be fixedly coupled with the main body. The front wall, the rear wall, the first side wall, the second side wall, and the bottom wall are configured to define an open region of the main body for routing, storing, and/or organizing fiber optic cables. The front wall of the main body includes a forward facing surface configured to abut a rearward facing surface of the connection block. The connection block includes a forward facing surface having a connection port configured to receive a first fiber optic connector, the front wall of the main body includes a rear facing surface having a connection port configured to receive a second fiber optic connector, and the connection port of the connection block is configured to be aligned with the connection port of the main body such that the connection block and the main body are configured to optically couple the first fiber optic connector with the second fiber optic connector. The connection block is a single piece of unitary construction, and the connection block and the main body are configured to provide an adapter-less fiber optic connection for the first and second fiber optic connectors.

In some aspects, the forward facing surface of the main body includes a plurality of interior sleeve holding portions, and the rear facing surface of the connection block includes a plurality of interior sleeve holding portions aligned with the plurality of interior sleeve holding portions in the forward facing surface of the main body. According to some aspects, the interior sleeve holding portions in the rear facing surface of the connection block and the interior sleeve holding portions in the front facing surface of the front wall of the main body are configured to receive a sleeve. In various aspects, the sleeve includes a bore having opposite ends configured to receive a pair of ferrules from an input fiber connector and an output fiber connector.

According to various aspects, the rear wall of the main body includes a cutout configured to receive an adapter configured to optically couple an input multi-fiber cable and an output multi-fiber cable. In some aspects, the connection port at the rear facing surface of the front wall of the main body is configured to receive the second fiber optic connector, which terminates one fiber of the output multi-fiber cable.

In various aspects, the support frame further includes fiber management features configured to retain fiber optic cables in the open region of the main body.

In accordance with various exemplary embodiments of the disclosure, a support frame configured to provide adapter-less fiber optic connections for fiber optic cables includes a main body having a front wall and a rear wall, and a connection block configured to be fixedly coupled with the main body. The front wall of the main body includes a forward facing surface configured to abut a rearward facing surface of the connection block, the connection block includes a forward facing surface having a connection port configured to receive a first fiber optic connector, and the front wall of the main body includes a rear facing surface having a connection port configured to receive a second fiber optic connector. The connection port of the connection block is configured to be aligned with the connection port of the main body such that the connection block and the main body are configured to optically couple the first fiber optic connector with the second fiber optic connector. The connection block comprises a single piece of unitary construction, and the connection block and the main body are configured to provide an adapter-less fiber optic connection for the first and second fiber optic connectors.

According to some aspects, the forward facing surface of the main body includes a plurality of interior sleeve holding portions, and the rear facing surface of the connection block includes a plurality of interior sleeve holding portions aligned with the plurality of interior sleeve holding portions in the forward facing surface of the main body. In some aspects, the interior sleeve holding portions in the rear facing surface of the connection block and the interior sleeve holding portions in the front facing surface of the front wall of the main body are configured to receive a sleeve. According to various aspects, the sleeve includes a bore having opposite ends configured to receive a pair of ferrules from an input fiber connector and an output fiber connector.

In various aspects, the rear wall of the main body includes a cutout configured to receive an adapter configured to optically couple an input multi-fiber cable and an output multi-fiber cable. In some aspects, the connection port at the rear facing surface of the front wall of the main body is configured to receive the second fiber optic connector, which terminates one fiber of the output multi-fiber cable.

According to some aspects, the support frame further includes fiber management features configured to retain fiber optic cables in the open region of the main body.

In various aspects, the main body is configured to define an open region for routing, storing, and/or organizing fiber optic cables.

According to various exemplary embodiments of the disclosure, a support frame configured to provide adapter-less fiber optic connections for fiber optic cables includes a connection block configured to be fixedly coupled with a main body. A front wall of the main body includes a surface configured to abut a surface of the connection block, the connection block includes a connection port configured to receive a first fiber optic connector, and the front wall of the main body includes a connection port configured to receive a second fiber optic connector. The connection port of the connection block is configured to be aligned with the connection port of the main body such that the connection block and the main body are configured to optically couple the first fiber optic connector with the second fiber optic connector, and the connection block and the main body are configured to provide an adapter-less fiber optic connection for the first and second fiber optic connectors.

In some aspects, the connection block is a single piece of unitary construction.

In various aspects, the front wall of the main body includes a plurality of interior sleeve holding portions, and the surface of the connection block includes a plurality of interior sleeve holding portions aligned with the plurality of interior sleeve holding portions in the main body. According to some aspects, the interior sleeve holding portions in the connection block and the interior sleeve holding portions in the front wall of the main body are configured to receive a sleeve. According to various aspects, the sleeve includes a bore having opposite ends configured to receive a pair of ferrules from an input fiber connector and an output fiber connector.

According to some aspects, a rear wall of the main body includes a cutout configured to receive an adapter configured to optically couple an input multi-fiber cable and an output multi-fiber cable. In various aspects, the connection port at the front wall of the main body is configured to receive the second fiber optic connector, which terminates one fiber of the output multi-fiber cable.

According to various aspects, the support frame further includes fiber management features configured to retain fiber optic cables in an open region of the main body.

In some aspects, the main body is configured to define an open region for routing, storing, and/or organizing fiber optic cables.

In accordance with some aspects of the disclosure, a rack of a fiber distribution system includes a tray movable between an open position and a closed position and the support frame of any of the aforementioned embodiments and/or aspects secured to the tray.

The foregoing and other features of construction and operation of the invention will be more readily understood and fully appreciated from the following detailed disclosure, taken in conjunction with accompanying drawings. Throughout the description, like reference numerals will refer to like parts in the various embodiments and drawing figures.

DETAILED DESCRIPTION OF EMBODIMENTS

Figure 1:
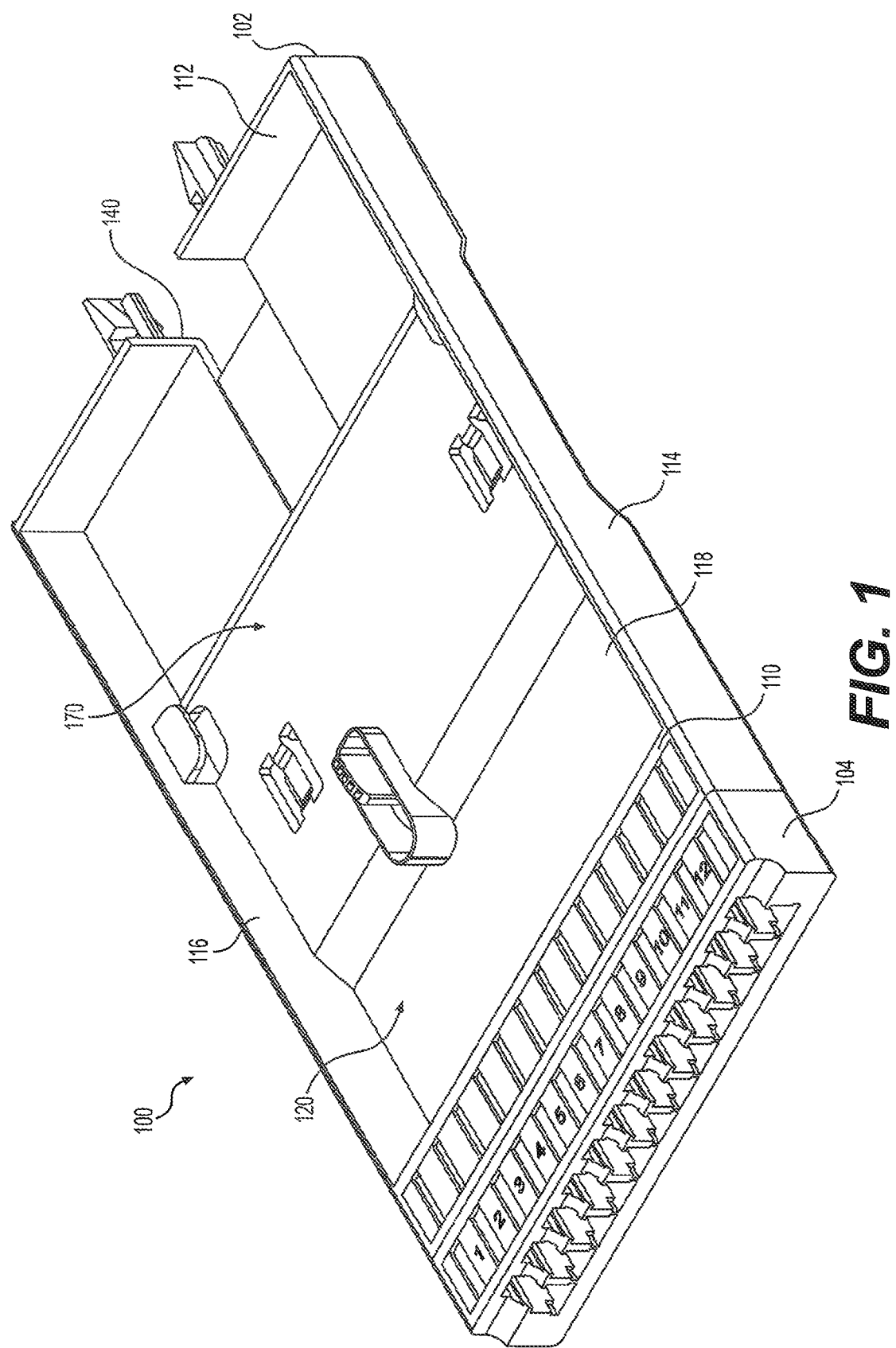
FIG. 1 is a perspective view of an exemplary support frame in accordance with various aspects of the present disclosure.

Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

As a preface to the detailed description, it should be noted that, as used in this specification and the appended claims, the singular forms "a," "an," and "the" include plural referents, unless the context clearly dictates otherwise.

Referring to the drawings, FIGS. 1-4 depict an exemplary embodiment of a support frame or support panel 100 according to various aspects of the disclosure. The support frame 100 may be mounted to a rack of a fiber distribution network, as will be discussed below.

The support frame 100 includes a main body 102 and a connection block 104. The connection block 104 is configured as a single piece of unitary construction and is fixedly coupled with the main body 102 by a mechanical connection, by welding, by an adhesive, or the like. In a preferred embodiment, the connection block 104 and the main body 102 are permanently fixed with one another for the life of the support frame.

Figure 4:
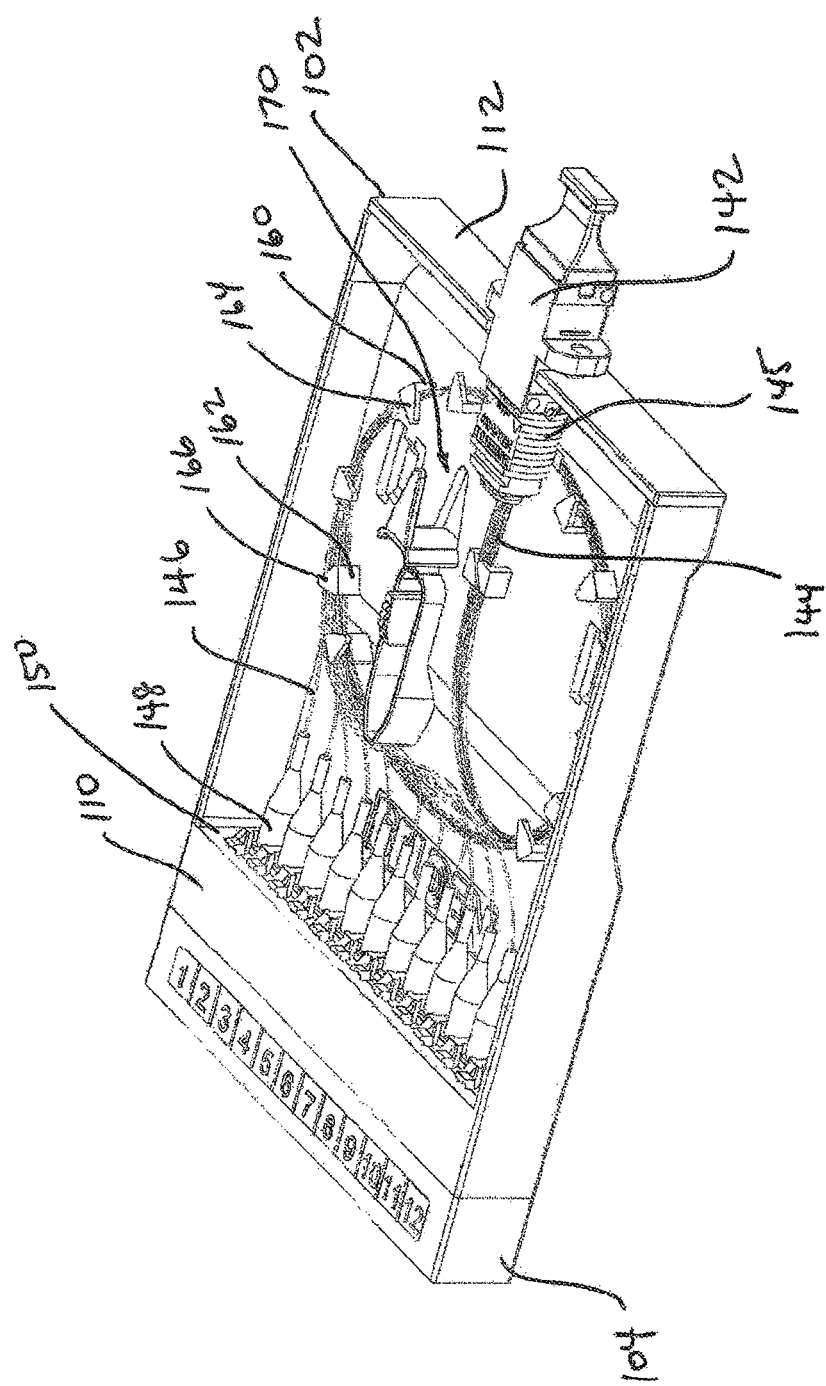
FIG. 4 is a perspective view of the exemplary support frame of FIG. 1 with fiber optic cables routed in support frame.

The main body 102 has a front wall 110, a rear wall 112, a first side wall 114, a second side wall 116, and a bottom wall 118. The first and second side walls 116, 118 oppose one another and extend from the front wall 110 to the rear wall 112. The bottom wall 118 extends from the first side wall 116 to the second side wall 118 in one direction and from the front wall 110 to the rear wall 112 in another direction. The front wall 110, rear wall 112, first side wall 114, second side wall 116, and bottom wall 118 define an open region 120 of the main body 102 for routing, storing, and/or organizing fiber optic cables (FIG. 4). The connection block 104 has a width dimension that substantially matches a width of the main body 102 from the first side wall 114 to the second side wall 116. Thus, the connection block 104 provides a continuous surface across a width of the support frame 100 that may include visible identification features, such as color coding and labeling.

Figure 2:
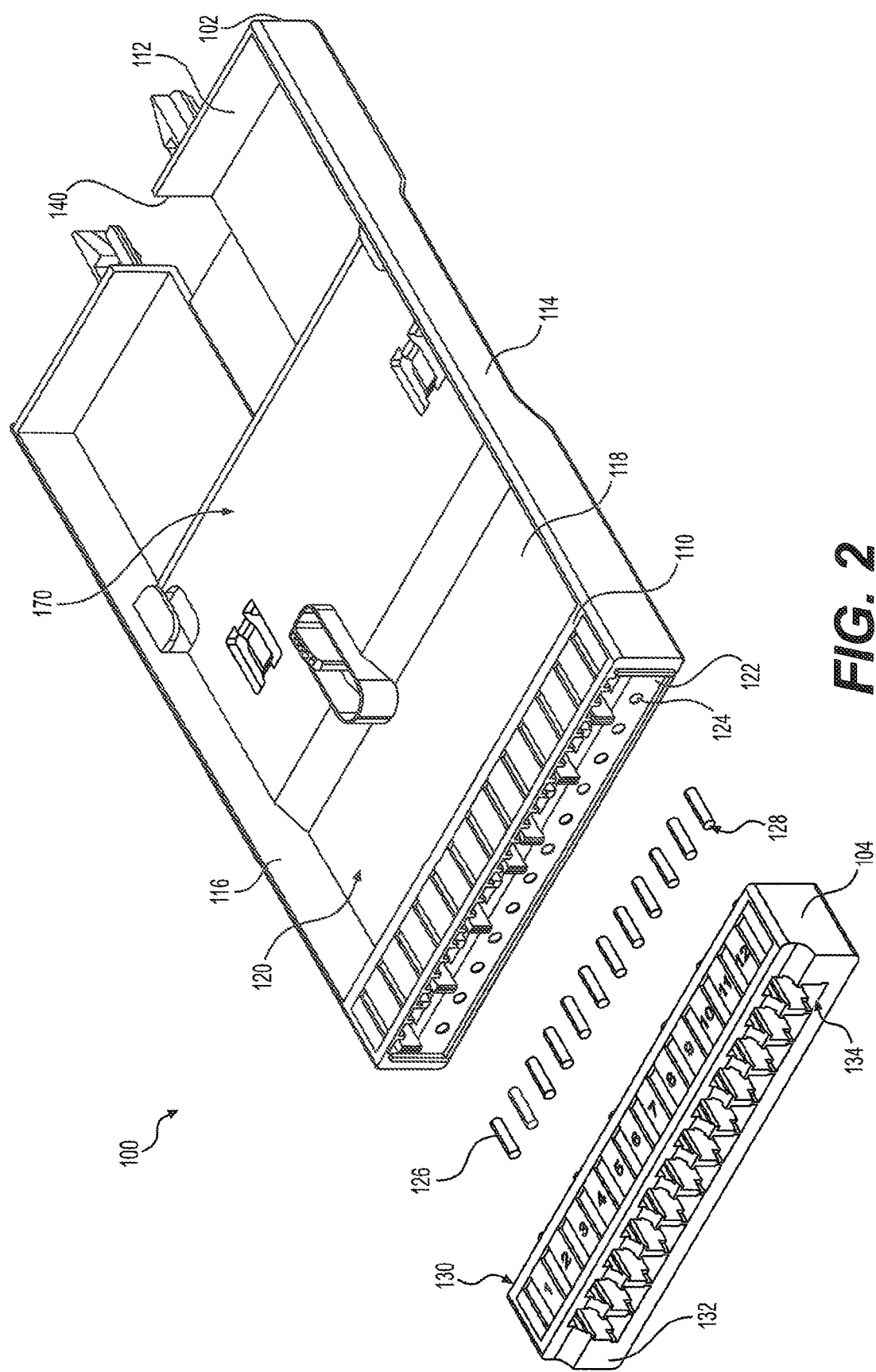
FIG. 2 is an exploded perspective view of the exemplary support frame of FIG. 1.

Referring to FIG. 2, the front wall 110 of the main body 102 includes a forward facing surface 122 that includes a plurality of interior sleeve holding portions 124 (first alignment portion). As illustrated, the forward facing surface 122 includes twelve interior sleeve holding portions 124. The connection block 104 includes a rear facing surface 130 having a plurality of interior sleeve holding portions (second alignment portion, not shown) matching the interior sleeve holding portions 124 in the forward facing surface 122. The rear facing surface 130 of the connection block 104 and the forward facing surface 122 of the main body 102 abut one another, as shown in FIG. 1.

The interior sleeve holding portions in the rear facing surface 130 of the connection block 104 are aligned with the interior sleeve holding portions 124 in the forward facing surface 122. Each of the interior sleeve holding portions 124 and the interior sleeve holding portions in the connection block 104 is sized to receive a sleeve 126, for example, a ceramic sleeve. The sleeve 126 extends into the interior sleeve holding portions 124 of the front wall 110 of the main body 102 and into the interior sleeve holding portions of the connection block 104. The sleeve 126 includes a bore 128 having opposite ends configured to receive a pair of ferrules from an input fiber connector and an output fiber connector, as will be described in more detail below. The sleeve 126 facilitates alignment of the pair of ferrules to provide an optical connection between an input fiber and an output fiber, as would be understood by persons skilled in the art. As illustrated, support frame 100 includes twelve sleeves 126, thereby facilitating optical connections between twelve pairs of fiber optic cables.

The connection block 104 has a forward facing surface 132 that includes one or more connection ports 134. As illustrated, the forward facing surface 132 includes twelve ports 134, with each of the ports 134 being configured to receive a fiber optic connector (not shown) having a ferrule containing an optical fiber, as would be understood by persons skilled in the art. Each port 134 is configured to provide an optical connection between a pair of fiber optic cables via one of the sleeves 126. It should be appreciated that in other embodiments the forward facing surface 132 may include fewer than twelve ports. For example, in another embodiment, the forward facing surface 132 may include six ports, with each of the ports being configured to receive two fiber optic connectors. In such an alternate embodiment, the connection block 104 can provide optical connections between twelve pairs of fiber optic cables.

Figure 3:
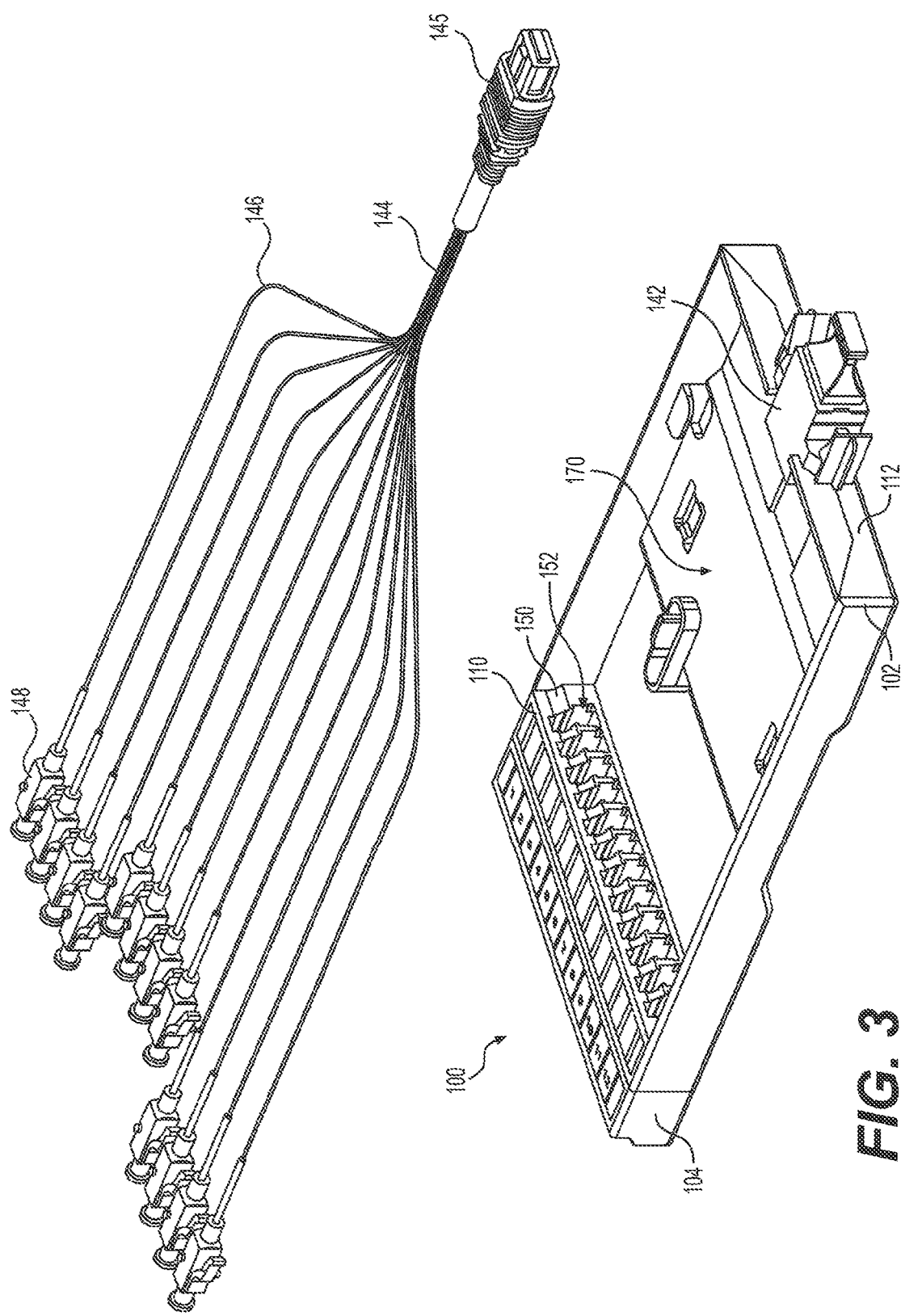
FIG. 3 is a perspective view of the exemplary support frame of FIG. 1 and fiber optic cables to be routed in the support frame.

The rear wall 112 of the main body 102 includes a cutout 140 configured to receive an adapter 142, as shown in FIGS. 3 and 4. The adapter 142 may be a Multi-fiber Push On (MPO) adapter configured to optically couple an input multi-fiber cable (not shown) and an output multi-fiber cable 144. For example, the input and output multi-fiber cables 144 may be twelve fiber cables, with each of the multi-fiber cables 144 being terminated by a connector 145, for example, an MPO connector, configured to be coupled to one another via the MPO adapter. It should be appreciated that the adapter 142 and the connectors 145 may be any other multi-fiber connector. As shown in FIG. 3, the output multi-fiber cable 144 may be broken out into twelve separate fiber cables 146. Each of the fiber cables 146 is terminated with a fiber optic connector 148.

Referring still to FIG. 3, the front wall 110 of the main body 102 includes a rear facing surface 150 having one or more connection ports 152. As illustrated, the rear facing surface 150 of the front wall 110 includes twelve ports 152, with each of the ports 152 being configured to receive one of the fiber optic connectors 148. Each of the fiber optic connectors 148 includes a ferrule containing an optical fiber, as would be understood by persons skilled in the art. Each port 152 is thus configured to provide an optical connection between a pair of fiber optic cables via one of the sleeves 126. It should be appreciated that in other embodiments the rear facing surface 150 may include fewer than twelve ports. For example, in another embodiment, the rear facing surface 150 may include six ports, with each of the ports being configured to receive two fiber optic connectors. In such an alternate embodiment, the front wall 110 can provide optical connections between twelve pairs of fiber optic cables.

Referring again to FIGS. 1-4, the support frame 100 may include a plurality of fiber management features configured to retain fiber optic cables in the open region 120 of the main body 102. For example, the support frame 100 may include projections 160, 162 extending substantially perpendicular from the bottom wall 118 into the open region 120. A free end of each projection 160, 162 may include a finger 164, 166 that extends in a direction parallel to a plane of the bottom wall 118. Some of the fingers 164 may extend inward, and other fingers 166 may extend outward.

The projections 160, 162 and fingers 164, 166 are configured to route the fiber cables 146 in a safe and organized manner. For example, the projections 160, 162 may be arranged such that the fiber cables 146 can be wrapped in a circular arrangement with some projections 160 radially outward of the cables 146 and some projections 162 radially inward of the fiber cables, as shown in FIG. 4. The projections 162, 164 may form a circular path having a radius that prevents the fiber cables from bending beyond the limits that the specification of the fiber cable allows, thereby avoiding bend loss within the fiber cables 146. The projections 162, 164 also prevent the looped cables from unraveling. The fingers 164, 166 maintain the fiber cables 146 in the open region 120 of the support frame 100. Thus, the projections 160, 162 and fingers 164, 166 provide a convenient and organized way to route the fiber cables through the support frame 100 and to maintain the fiber cable signal integrity.

In some embodiments, the fiber cables 146 may be secured to the main body 102 via tape (not shown). The tape may be provided in addition to or as an alternative to the fiber management features described above. Alternatively, or additionally, the fiber cables 146 may be secured to the main body 102 via glue, epoxy, over molding, etc. In any embodiment, the support frame 100 is configured to be mounted to rack in a horizontal orientation with the bottom wall 118 at an upper or lower position relative to the ground or floor, or in a vertical orientation with the bottom wall perpendicular to the ground or floor, or in any other desired orientation.

Figure 5A:
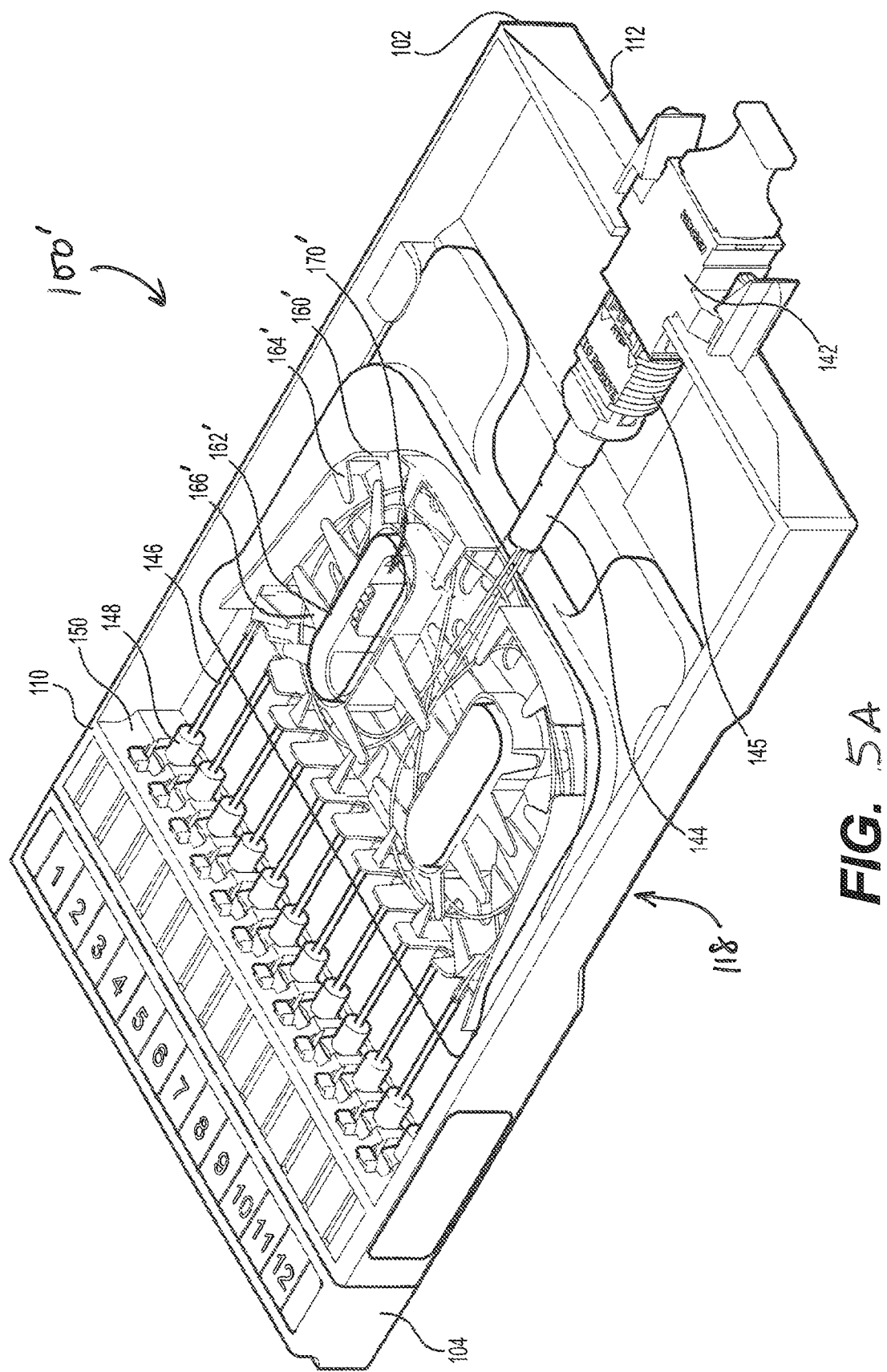
FIGS. 5A and 5B are perspective views of another exemplary support frame in accordance with various aspects of the present disclosure.
Figure 5B:
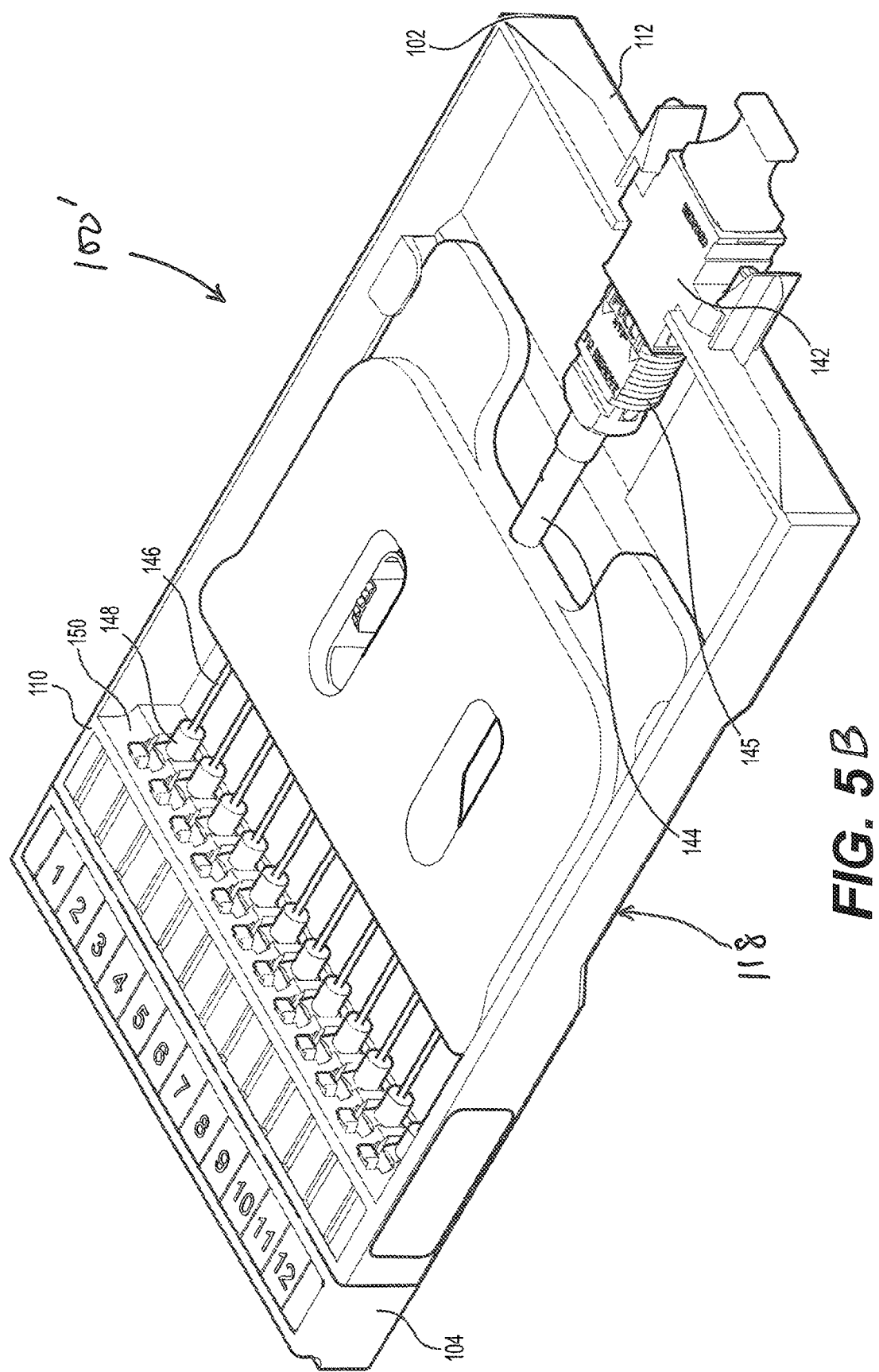

Referring now to FIGS. 5A and 5B, in some embodiments, the support frame 100' may include a fiber management structure 105. The fiber management structure 105 may be removably coupled with the support frame 100' and may have a closed top, as shown in FIGS. 5A and 5B, or an open top (not shown). The fiber management structure 105 may include a plurality of fiber management features configured to retain fiber optic cables. For example, the fiber management structure 105 may include walls 160', 162' extending substantially perpendicular relative to the bottom wall 118. Finger 164', 166' may extend from the walls 160', 162' in a direction parallel to a plane of the bottom wall 118. Some of the fingers 164' may extend inward, and other fingers 166' may extend outward.

The walls 160', 162' and fingers 164', 166' are configured to route the fiber cables 146 in a safe and organized manner. For example, the walls 160', 162' may be arranged such that the fiber cables 146 can be wrapped in a circular arrangement with some walls 160' radially outward of the cables 146 and some walls 162' radially inward of the fiber cables, as shown in FIG. 5A. The walls 162', 164' may define circular paths having radii that prevent the fiber cables from bending beyond the limits that the specification of the fiber cable allows, thereby avoiding bend loss within the fiber cables 146. The walls 162', 164' also prevent the looped cables from unraveling. The fingers 164', 166' maintain the fiber cables 146 in the circular paths. Thus, the walls 160', 162' and fingers 164', 166' provide a convenient and organized way to route the fiber cables through the support frame 100' and to maintain the fiber cable signal integrity.

In some embodiments, the fiber cables 146 may be secured to the fiber management structure 105 via tape (not shown). The tape may be provided in addition to or as an alternative to the fiber management features described above. Alternatively, or additionally, the fiber cables 146 may be secured to the fiber management structure 105 via glue, epoxy, over molding, etc. In any embodiment, the support frame 100' is configured to be mounted to rack in a horizontal orientation with the bottom wall 118 at an upper or lower position relative to the ground or floor, or in a vertical orientation with the bottom wall perpendicular to the ground or floor, or in any other desired orientation.

Figure 6:
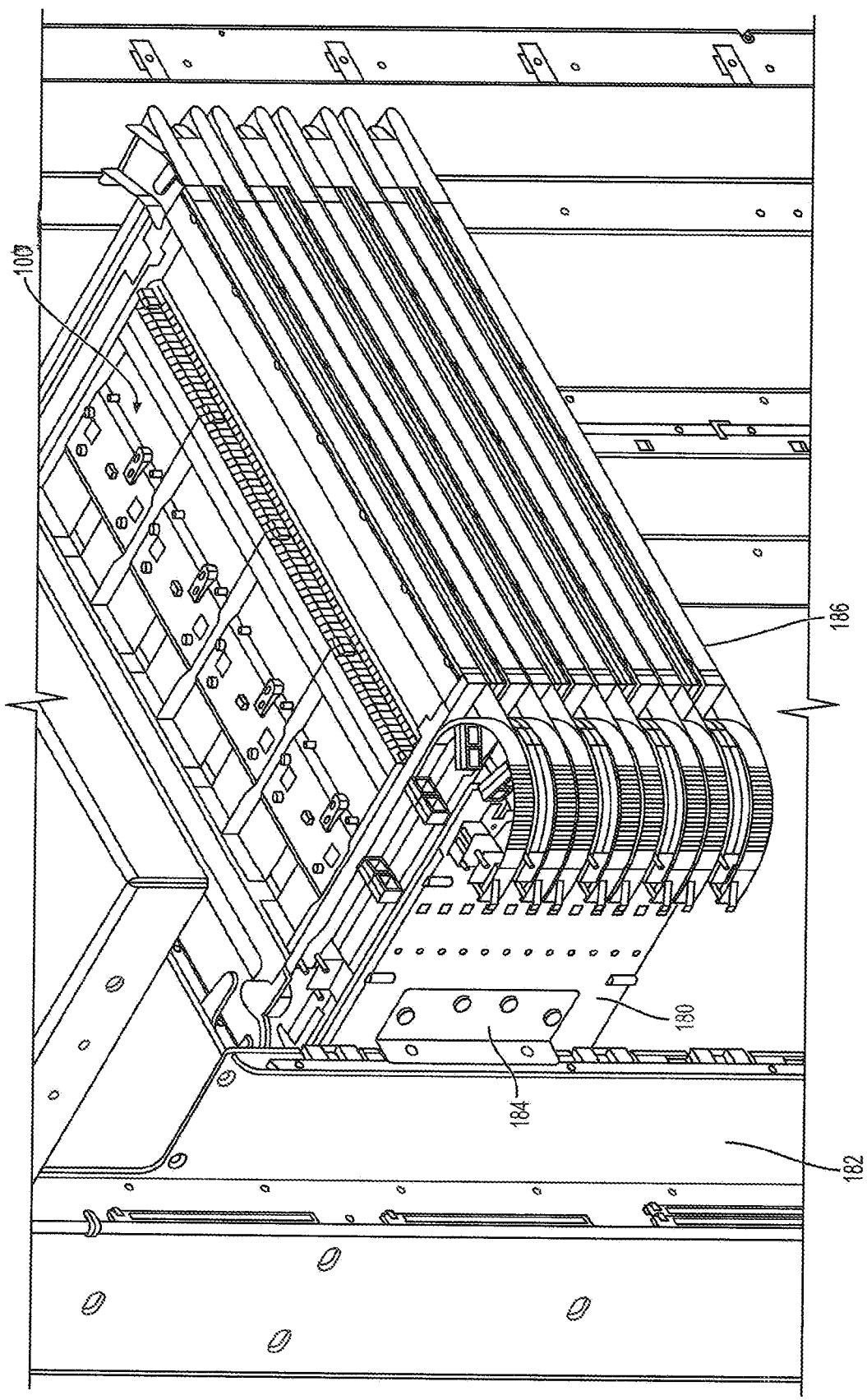
FIG. 6 is a perspective view of rack of a fiber distribution network including the exemplary support frame of FIG. 1 on a fully closed tray.
Figure 7:
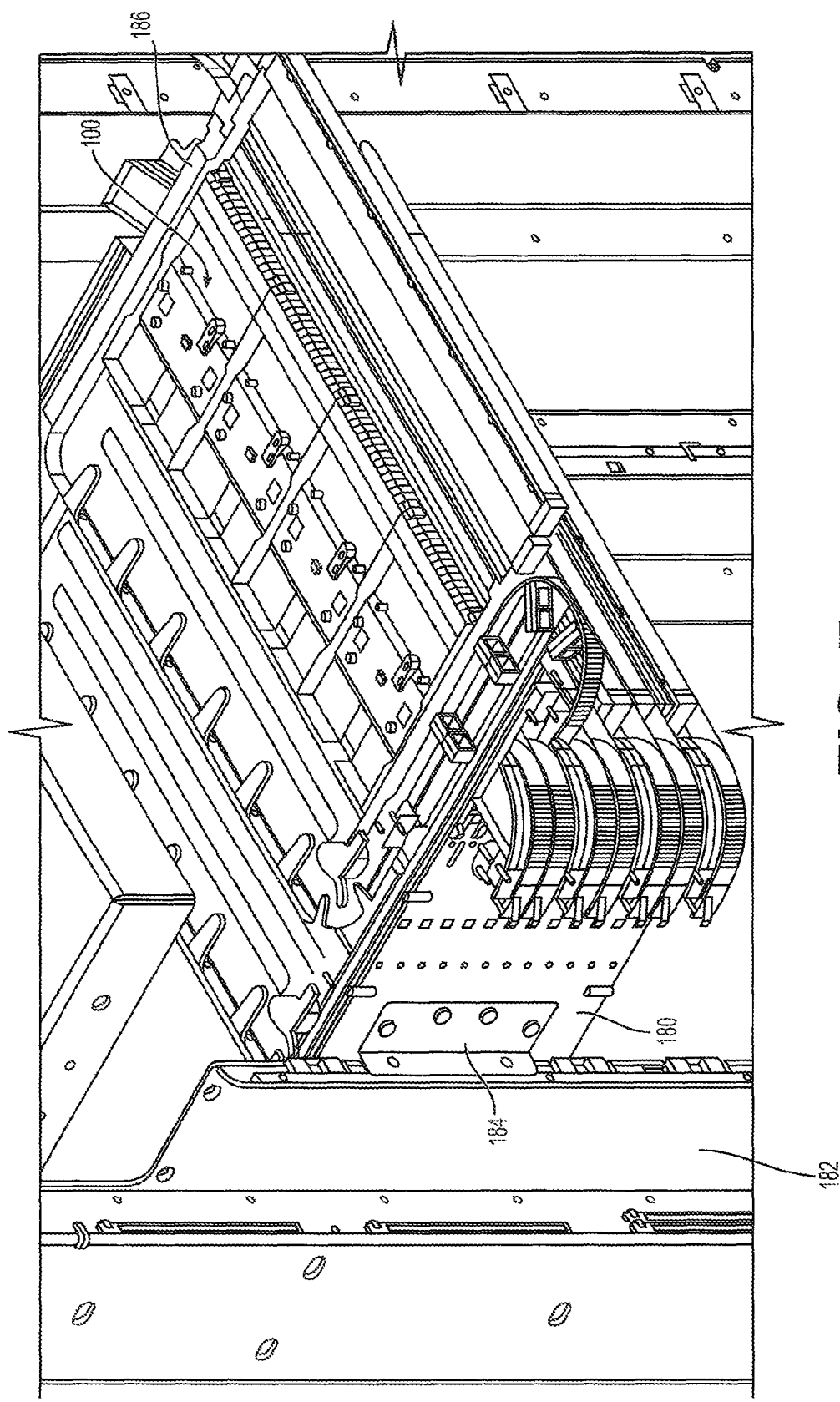
FIG. 7 is a perspective view of rack of a fiber distribution network including the exemplary support frame of FIG. 1 on a fully open tray.
Figure 8:
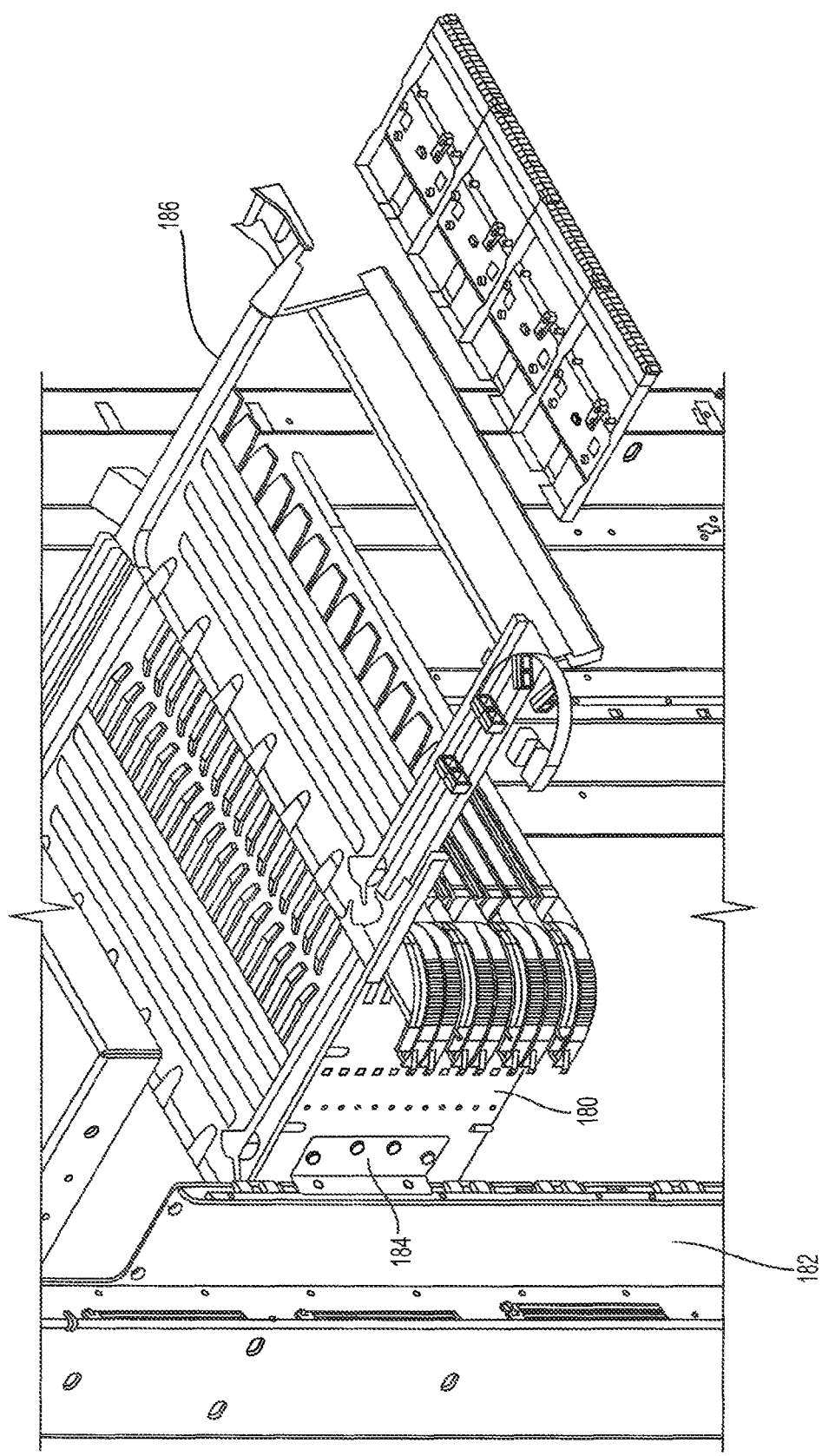
FIG. 8 is a perspective view of rack of a fiber distribution network with a fully open tray and the exemplary support frame of FIG. 1 extracted from the rack.

Referring now to FIGS. 6-8, the support frame 100 (or support frame 100') may be mounted within a case 180, which can be mounted to a rack 182 of a fiber distribution network. The case 180 is illustratively mounted to the rack 182 via a pair of mounting brackets 184 and is configured to receive trays 186. Each tray 186 may hold one or more support frames 100 (or support frames 100') arranged side-by-side across a width of the tray 186. In some embodiments, the trays 186 may be mounted in a 19" rack, a cross connect system, a fiber bay, a wall mount, or the like. The support frame 100 (or support frame 100') may include a connection feature, for example, connection feature 170 (or connection feature 170') or any other connection feature, configured to secure the support frame 100 (or support frame 100') to the tray 186.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A support frame configured to provide adapter-less fiber optic connections for fiber optic cables and configured to be mounted to a rack of a fiber distribution system comprising:
   a main body having a front wall, a rear wall, a first side wall, a second side wall, and a bottom wall;
   a connection block configured to be fixedly coupled with the main body;
   wherein the front wall, the rear wall, the first side wall, the second side wall; and the bottom wall are configured to define an open region of the main body for routing, storing, and/or organizing fiber optic cables;
   wherein the front wall of the main body includes a forward facing surface configured to abut a rearward facing surface of the connection block;
   wherein the connection block includes a forward facing surface having a connection port configured to receive a first fiber optic connector;
   wherein the front wall of the main body includes a rear facing surface having a connection port configured to receive a second fiber optic connector;
   wherein the connection port of the connection block is configured to be aligned with the connection port of the main body such that the connection block and the main body are configured to optically couple the first fiber optic connector with the second fiber optic connector;
   wherein the connection block comprises a single piece of unitary construction; and
   wherein the connection block and the main body are configured to provide an adapter-less fiber optic connection for the first and second fiber optic connectors.

2. The support frame of claim 1, wherein the forward facing surface of the main body includes a plurality of interior sleeve holding portions; and
   wherein the rear facing surface of the connection block includes a plurality of interior sleeve holding portions aligned with the plurality of interior sleeve holding portions in the forward facing surface of the main body.

3. The support frame of claim 2, wherein the interior sleeve holding portions in the rear facing surface of the connection block and the interior sleeve holding portions in the front facing surface of the front wall of the main body are configured to receive a sleeve.

4. The support frame of claim 3, wherein the sleeve includes a bore having opposite ends configured to receive a pair of ferrules from an input fiber connector and an output fiber connector.

5. The support frame of claim 1, wherein the rear wall of the main body includes a cutout configured to receive an adapter configured to optically couple an input multi-fiber cable and an output multi-fiber cable.

6. The support frame of claim 5, wherein the connection port at the rear facing surface of the front wall of the main body is configured to receive the second fiber optic connector, which terminates one fiber of the output multi-fiber cable.

7. The support frame of claim 1, further comprising fiber management features configured to retain fiber optic cables in the open region of the main body.

8. A support frame configured to provide adapter-less fiber optic connections for fiber optic cables comprising:
a main body having a front wall and a rear wall;
a connection block configured to be fixedly coupled with the main body;
wherein the front wall of the main body includes a forward facing surface configured to abut a rearward facing surface of the connection block;
wherein the connection block includes a forward facing surface having a connection port configured to receive a first fiber optic connector;
wherein the front wall of the main body includes a rear facing surface having a connection port configured to receive a second fiber optic connector;
wherein the connection port of the connection block is configured to be aligned with the connection port of the main body such that the connection block and the main body are configured to optically couple the first fiber optic connector with the second fiber optic connector;
wherein the connection block comprises a single piece of unitary construction; and
wherein the connection block and the main body are configured to provide an adapter-less fiber optic connection for the first and second fiber optic connectors.

9. The support frame of claim 8, wherein the forward facing surface of the main body includes a plurality of interior sleeve holding portions; and
wherein the rear facing surface of the connection block includes a plurality of interior sleeve holding portions aligned with the plurality of interior sleeve holding portions in the forward facing surface of the main body.

10. The support frame of claim 9, wherein the interior sleeve holding portions in the rear facing surface of the connection block and the interior sleeve holding portions in the front facing surface of the front wall of the main body are configured to receive a sleeve.

11. The support frame of claim 10, wherein the sleeve includes a bore having opposite ends configured to receive a pair of ferrules from an input fiber connector and an output fiber connector.

12. The support frame of claim 8, wherein the rear wall of the main body includes a cutout configured to receive an adapter configured to optically couple an input multi-fiber cable and an output multi-fiber cable.

13. The support frame of claim 12, wherein the connection port at the rear facing surface of the front wall of the main body is configured to receive the second fiber optic connector, which terminates one fiber of the output multi-fiber cable.

14. The support frame of claim 8, further comprising fiber management features configured to retain fiber optic cables in the open region of the main body.

15. The support frame of claim 8, wherein the main body is configured to define an open region for routing, storing, and/or organizing fiber optic cables.

16. A support frame configured to provide adapter-less fiber optic connections for fiber optic cables comprising:
a connection block configured to be fixedly coupled with a main body;
wherein a front wall of the main body includes a surface configured to abut a surface of the connection block;
wherein the connection block includes a connection port configured to receive a first fiber optic connector;
wherein the front wall of the main body includes a connection port configured to receive a second fiber optic connector;
wherein the connection port of the connection block is configured to be aligned with the connection port of the main body such that the connection block and the main body are configured to optically couple the first fiber optic connector with the second fiber optic connector; and
wherein the connection block and the main body are configured to provide an adapter-less fiber optic connection for the first and second fiber optic connectors.

17. The support frame of claim 16, wherein the connection block comprises a single piece of unitary construction.

18. The support frame of claim 16, wherein the front wall of the main body includes a plurality of interior sleeve holding portions; and
wherein the surface of the connection block includes a plurality of interior sleeve holding portions aligned with the plurality of interior sleeve holding portions in the main body.

19. The support frame of claim 18, wherein the interior sleeve holding portions in the connection block and the interior sleeve holding portions in the front wall of the main body are configured to receive a sleeve.

20. The support frame of claim 19, wherein the sleeve includes a bore having opposite ends configured to receive a pair of ferrules from an input fiber connector and an output fiber connector.

21. The support frame of claim 16, wherein a rear wall of the main body includes a cutout configured to receive an adapter configured to optically couple an input multi-fiber cable and an output multi-fiber cable.

22. The support frame of claim 21, wherein the connection port at the front wall of the main body is configured to receive the second fiber optic connector, which terminates one fiber of the output multi-fiber cable.

23. The support frame of claim 16, further comprising fiber management features configured to retain fiber optic cables in an open region of the main body.

24. The support frame of claim 16, wherein the main body is configured to define an open region for routing, storing, and/or organizing fiber optic cables.

25. The support frame of claim 16, wherein the front wall surface of the main body is configured to block the connection block 104 from passing through the front wall.

26. The support frame of claim 16, wherein the front wall of the main body comprises a rearward facing surface that includes the connection port configured to receive a second fiber optic connector.

\* \* \* \* \*